(12) United States Patent
Kubota et al.

(10) Patent No.: US 7,418,886 B2
(45) Date of Patent: Sep. 2, 2008

(54) SPLIT TYPE CONNECTING ROD

(75) Inventors: Tsuyoshi Kubota, Iwata (JP); Tsuneo Isobe, Iwata (JP); Shinya Iwasaki, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 493 days.

(21) Appl. No.: 10/743,458

(22) Filed: Dec. 23, 2003

(65) Prior Publication Data

US 2004/0159179 A1  Aug. 19, 2004

(30) Foreign Application Priority Data

Dec. 26, 2002 (JP) ............................. 2002-378020
Sep. 8, 2003 (JP) ............................. 2003-315614

(51) Int. Cl.
*F16C 9/02* (2006.01)

(52) U.S. Cl. ............................................ 74/593

(58) Field of Classification Search .............. 29/888.09; 74/593, 594; 384/288, 294, 430, 432, 433, 384/906

See application file for complete search history.

(56) References Cited

U.S. PATENT DOCUMENTS

| 4,569,109 A | 2/1986 | Fetouh |
| 4,693,139 A | 9/1987 | Mukai et al. |
| 5,208,979 A | 5/1993 | Schmidt |
| 6,312,159 B1 | 11/2001 | Ishida et al. |
| 2002/0148434 A1* | 10/2002 | Iida et al. ............... 123/197.3 |

FOREIGN PATENT DOCUMENTS

| JP | 58-21017 | 2/1983 |
| JP | 61-27304 | 2/1986 |
| JP | 10-128481 | 5/1998 |

OTHER PUBLICATIONS

Official Communication issued in the corresponding European Application No. 03029940.8, dated Mar. 31, 2006.

* cited by examiner

*Primary Examiner*—Chong H Kim
(74) *Attorney, Agent, or Firm*—Keating & Bennett, LLP

(57) ABSTRACT

A split type connecting rod is capable of preventing problems of peeling and falling at the time of fracturing and splitting, securing alignment accuracy after the fracturing, reducing a processing time necessary for processing the groove and improving the processing accuracy. This split type connecting rod 100 includes a valley 106 formed on the inner circumferential surface of a crank-pin hole 101*d* of a large end portion 101*e*. Fracture starting point grooves 105 are also formed at the base of the valley 106.

17 Claims, 11 Drawing Sheets

SPLIT TYPE CONNECTING ROD

BACKGROUND OF THE INVENTION

1. Field of the Invention

The present invention relates to a split type connecting rod, in which a large end portion that has been subjected to surface hardening treatment is fractured and split into a rod portion and a cap portion, and the rod portion and the cap portion are recoupled using a coupling bolt while keeping the fractured surfaces of the respective portions aligned.

2. Description of the Related Art

Figure 1A:
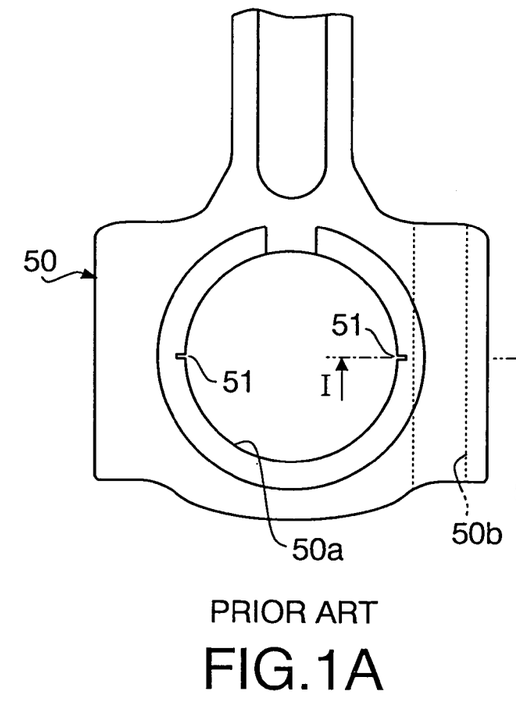
FIG. 1A is a front view of a conventional general split type connecting rod.
Figure 1B:
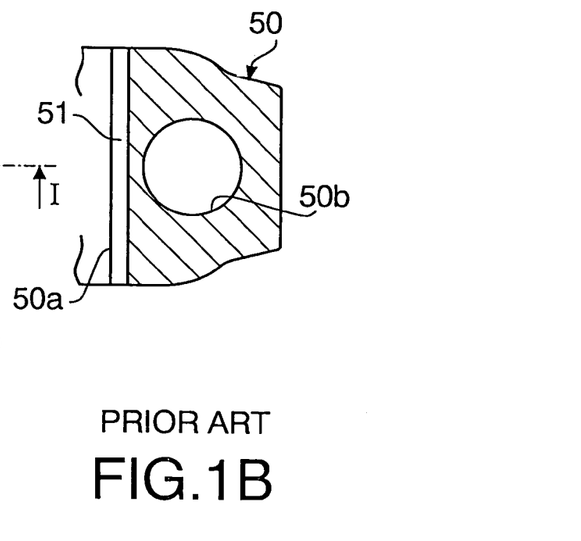
FIG. 1B is a cross-sectional view of the split type connecting rod shown in FIG. 1A along a line I-I.

When fracturing and splitting a large end portion into a rod portion and a cap portion, this kind of split type connecting rod may be provided with a fracture starting point groove for initiating the fracture. For example, as shown in FIG. 1A and FIG. 1B, a structure with a pair of fracture starting point grooves 51 which extend in the direction of the shaft center of a crank-pin hole 50a of a large end portion 50 notched and formed on the inner circumferential surface of the crank-pin hole 50a has been proposed (e.g., see U.S. Pat. No. 4,569, 109).

Figure 2A:
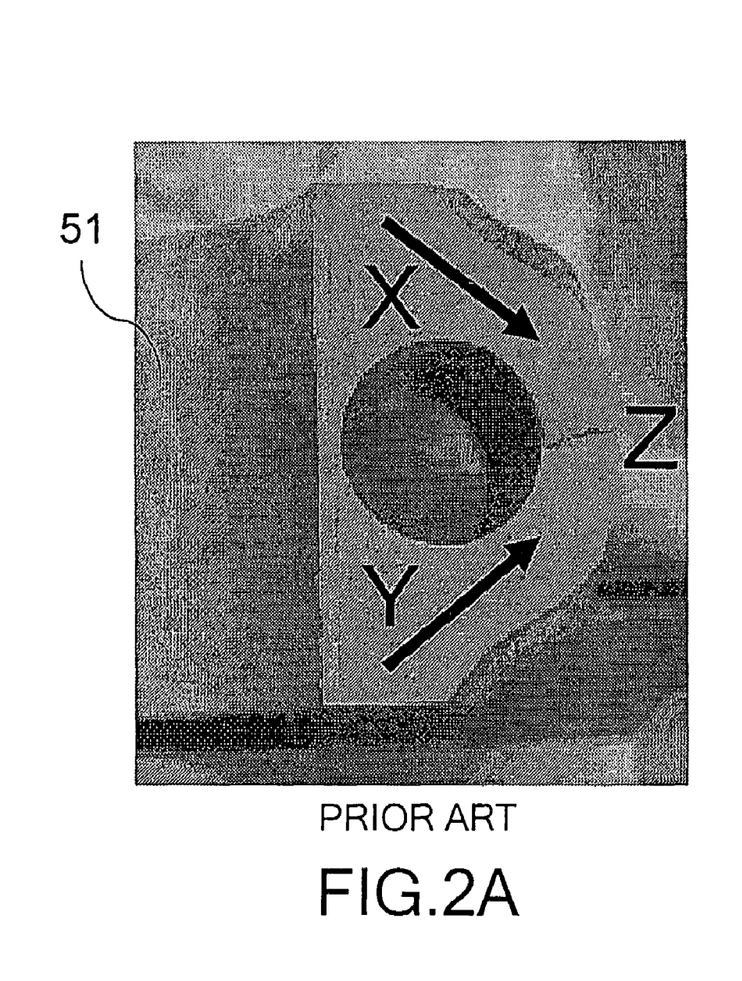
FIG. 2A is a view illustrating a fracture advancing path on a conventional fracture surface.
Figure 2B:
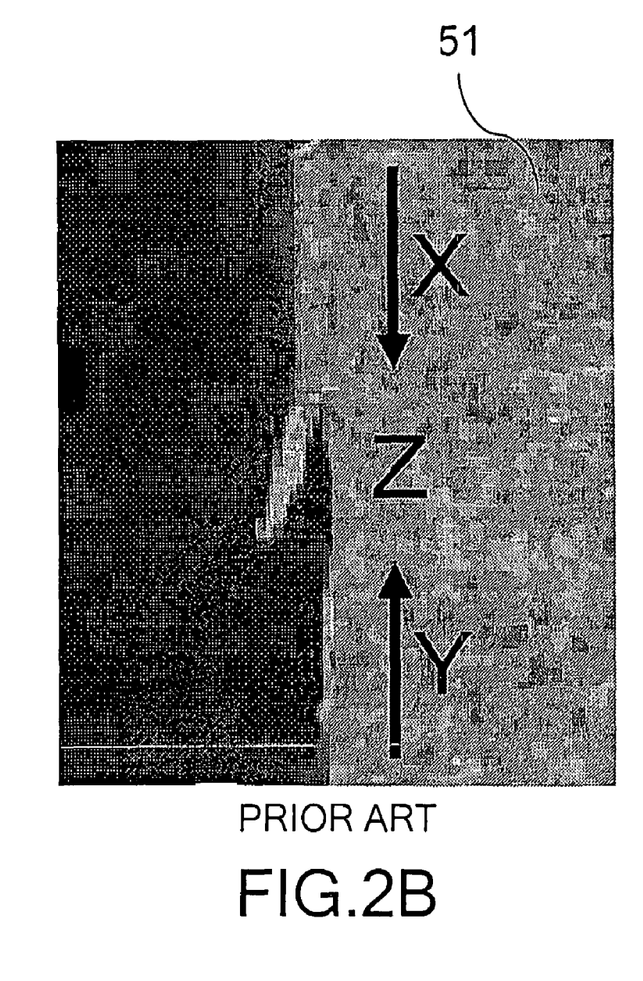
FIG. 2B is a side view showing a meeting part of the fracture advancing paths in conventional fracturing/splitting.

On the other hand, when the large end portion 50 is fractured and split, the fractured surfaces advance as shown in FIG. 2A and FIG. 2B from the fracture starting point groove 51 along paths indicated by arrows X and Y around the bolt holes and the paths will meet each other at an exterior wall portion Z.

However, if the fractured surfaces deviate while advancing along the paths indicated by arrows X and Y, the fractured surfaces fail to meet on the same plane crossing each other at the exterior wall portion Z, causing a level difference and cracking. This may cause peeling or falling of the fracture surfaces, which may damage the engine parts while the engine is running, causing engine trouble.

Figure 3:
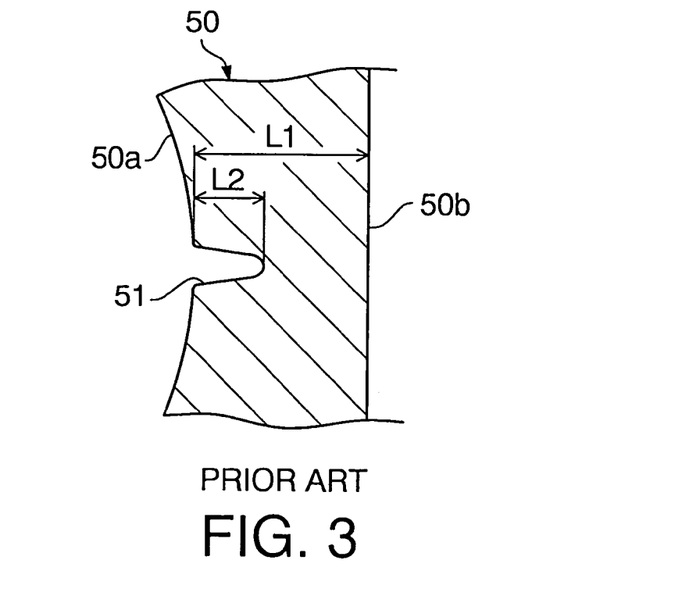
FIG. 3 is an enlarged view of a fracture starting point groove of a conventional general split type connecting rod.

Increasing the stress intensity factor of a bottom portion of the fracture starting point groove is effective for preventing the problem of peeling or falling. Thus, it is possible, as shown in FIG. 3, to increase the groove depth L2 of the fracture starting point groove 51 and increase the ratio of the groove depth L2 to the shortest distance L1 between the fracture starting point groove 51 and the edge of the bolt hole 50b.

However, increasing the groove depth L2 of the fracture starting point groove 51 causes many problems described in the following paragraph.

First, when surface hardening treatment such as carburization is applied to the connecting rod, the carburization may not reach the bottom portion of the fracture starting point groove and the surface hardened layer at the bottom portion may be shallow. As a result, the fracture starting point cannot be hardened enough, and therefore the surface may be easily transformed into a surface with ductile fractures and the accuracy of alignment between the rod portion and cap portion after the fracture may deteriorate.

Second, as the groove becomes deeper, the processing time required for machining of the groove increases and it is more difficult to control the groove depth accurately. This problem becomes particularly noticeable when groove machining is performed using a laser.

SUMMARY OF THE INVENTION

In order to solve the problems described above, preferred embodiments of the present invention provide a split type connecting rod that is capable of preventing problems such as peeling or falling during fracturing/splitting and securing alignment accuracy after the fracturing, thus further shortening the processing time required for processing grooves and improving processing accuracy.

According to a preferred embodiment of the present invention, a split type connecting rod includes a valley formed on the inner circumferential surface of a crank-pin hole and a fracture starting point groove formed at a base portion of the valley.

The split connecting rod of various preferred embodiments of the present invention is preferably a nut-less type of connecting rod formed by forging, casting or sintering.

It is preferred that a width of the fracture starting point groove is less than a width of the valley.

It is also preferred that the valley is formed such that the base portion is located at a position where a ratio of a depth of the fracture starting point groove to a shortest distance from an opening of the fracture starting point groove to a bolt hole is about 70% or more.

A preferred embodiment of the present invention also preferably includes a bearing locking groove provided on the inner circumferential surface of the crank-pin hole, wherein the valley is formed at a position opposite to the bearing locking groove provided on the inner circumferential surface of the crank-pin hole.

This bearing locking groove preferably includes a pair of concave portions located at positions that are deviated in the circumferential direction of the inner circumferential surface of the crank-pin hole.

It is also preferred that a width of valley in the circumferential direction of the inner circumferential surface is less than a width of the pair of concave portions of the bearing locking groove in the circumferential direction of the inner circumferential surface.

It is also preferred that a pair of the fracture starting point grooves are formed on the inner circumferential surface of the crank-pin hole.

The valley preferably includes a pair of sloped portions.

The sloped portions of the valley preferably define chamfers for guiding a bi-partitioned bearing metal element that is inserted into the crank-pin hole.

In various preferred embodiments, each of the sloped portions of the valley has one of a curved shape and a swelled, rounded shape.

It is also preferred that the valley has one of a concave shape in an upper corner thereof and a rectilinear shape in an upper corner thereof.

It is also preferred that an angle relative to a predetermined fracture plane passing from a shaft center of the crank-pin hole through a bottom portion in a bottom surface of the pair of fracture starting point grooves is approximately 45 degrees.

Also, an interior angle of the valley is preferably approximately 90 degrees.

It is further preferred that upper and lower inner surfaces of the fracture starting point grooves are formed such that an angle relative to a predetermined fracture plane passing from a shaft center of the crank-pin hole through a bottom portion in a bottom surface of the pair of fracture starting point grooves is about 0 degrees.

Also, it is preferred that a cross section of the valley is larger than a cross section of the fracture starting point groove.

The fracture starting point groove preferably includes substantially parallel walls which form an angle of about 0 degrees with respect to a predetermined fracture plane, and includes a substantially parallel groove having a bottom surface which connects the substantially parallel walls and forms an arc shape with a radius of R.

It is further preferred that a depth H from the inner circumferential surface of the crank-pin hole to a bottom portion of the bottom surface and the radius R are set such that a ratio H/R is about 1.0 to about 10.0.

According to another preferred embodiment of the present invention, an engine includes the split type connecting rod according to one of the preferred embodiments of the present invention described above.

According to yet another preferred embodiment of the present invention, a vehicle includes the split type connecting rod according to one of the preferred embodiments of the present invention described above.

According to a further preferred embodiment of the present invention, a method of forming a split type connecting rod includes providing a connecting rod, forming a crank-pin hole in the connecting rod, forming a valley on an inner circumferential surface of the crank-pin hole, the valley including a base portion, and forming a fracture starting point groove at the base portion of the valley.

It is preferred that the fracture starting point groove is formed after the valley is formed in the inner circumferential surface of the crank-pin hole.

The method also preferably includes the steps of providing surface hardening treatment to the split type connecting rod, fracturing and splitting the split type connecting rod into a rod portion and a cap portion to form fractured surfaces on both of the rod portion and the cap portion, aligning the fractured and split rod portion and cap portion with each other by contacting both fractured surfaces with each other, and coupling the rod portion and the cap portion together via coupling bolts.

It is further preferred that a pair of the fracture starting point grooves are formed by notching via one of cutting, wire cutting and machining using a laser.

In addition, the valley is preferably formed by chamfering upper and lower corners between the inner circumferential surface of the crank-pin hole and the fracture starting point grooves.

The valley is preferably formed by one of machining, forging, casting and sintering.

Other features, elements, characteristics, steps, and advantages of the present invention will become more apparent from the following detailed description of preferred embodiments with reference to the attached drawings.

DESCRIPTION OF THE PREFERRED EMBODIMENT

With reference now to the attached drawings, embodiments of the present invention will be explained below.

First Preferred Embodiment

Figure 4:
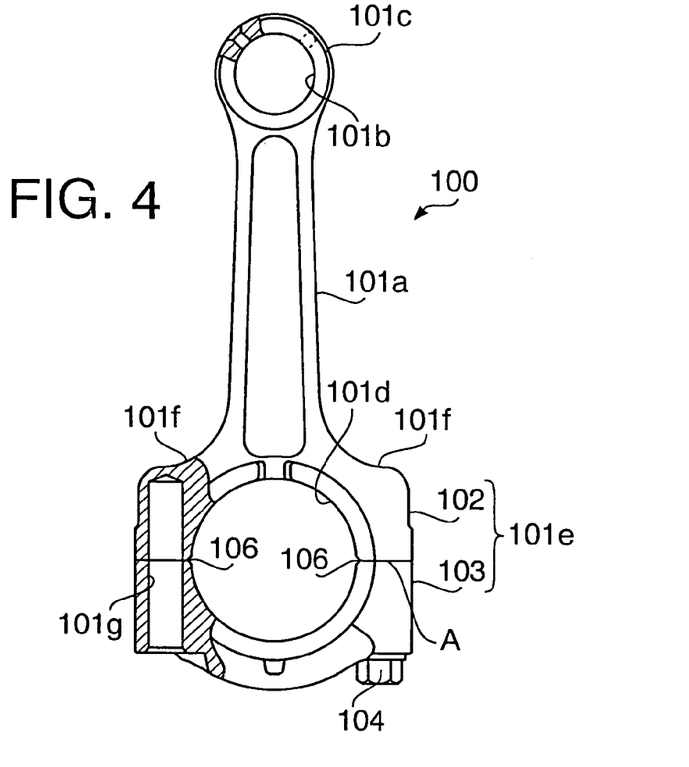
FIG. 4 is front view of a split type connecting rod according to a first preferred embodiment of the present invention.
Figure 5:
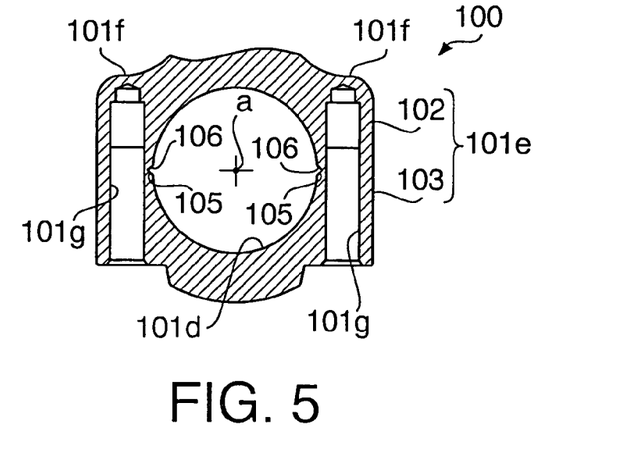
FIG. 5 is a cross-sectional view of a large end portion of the split type connecting rod shown in FIG. 4.
Figure 6A:
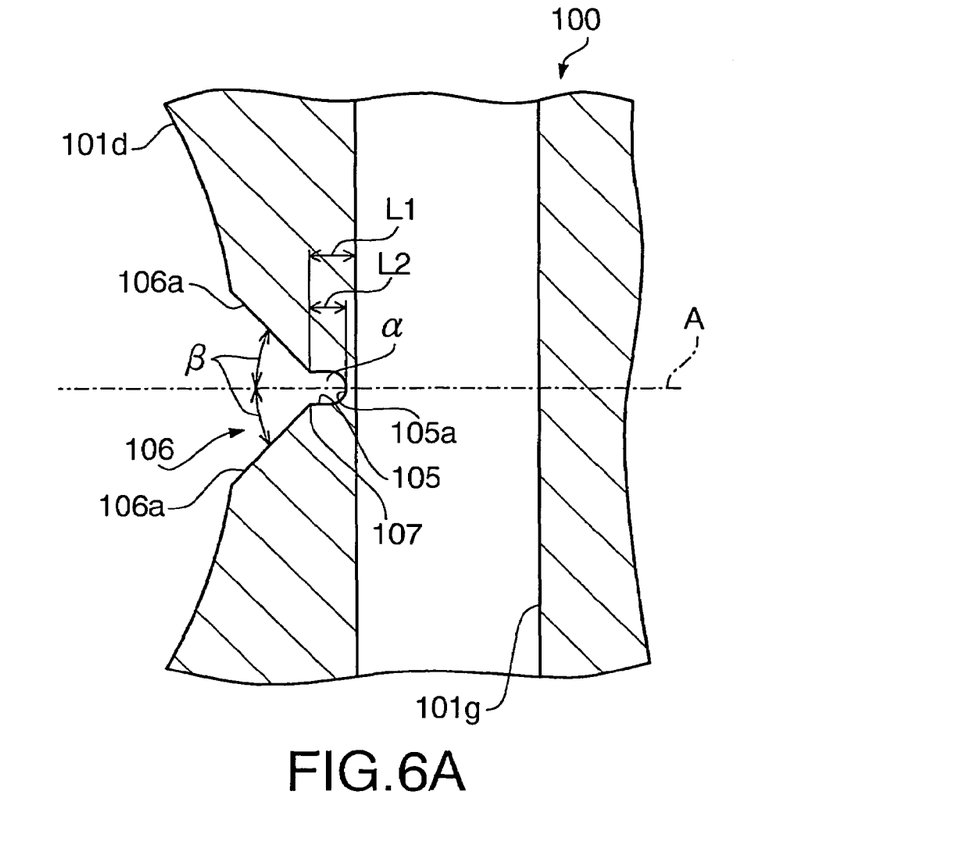
FIG. 6A is an enlarged view of a fracture starting point groove of the large end portion for illustrating the angle of a slope of the valley.
Figure 6B:
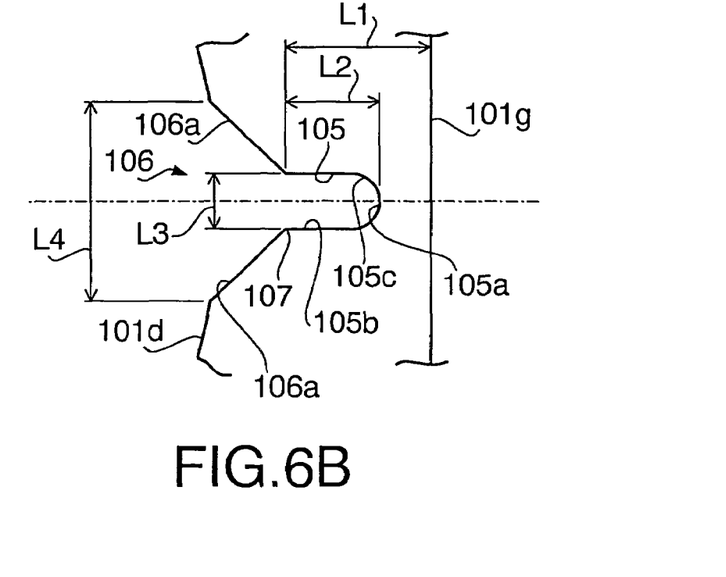
FIG. 6B is an enlarged view of the fracture starting point groove of the large end portion for illustrating the opening width of the valley.
Figure 7:
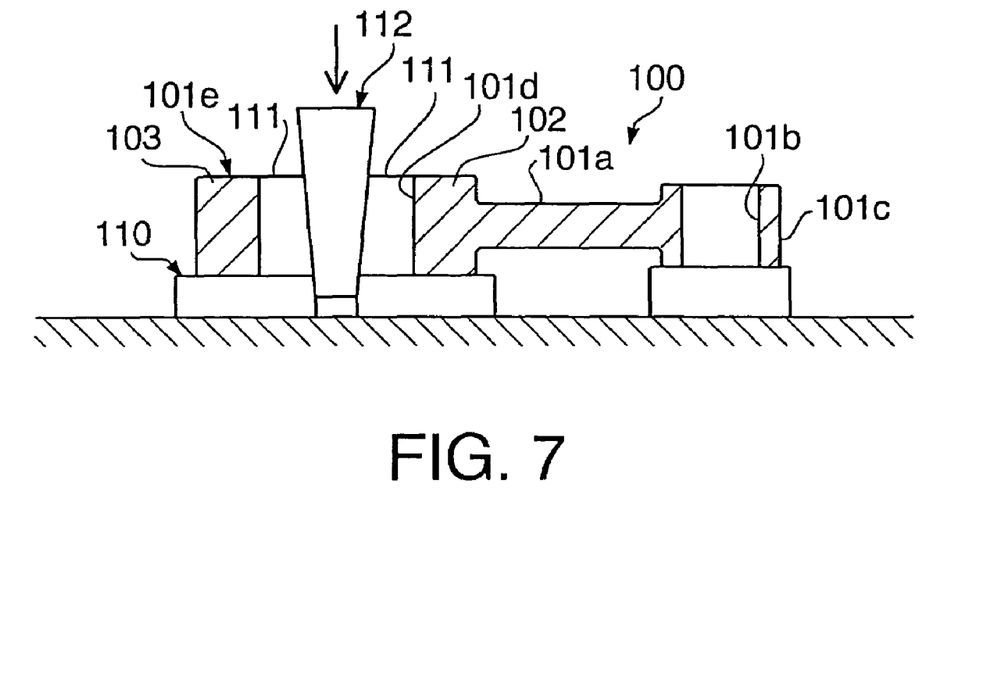
FIG. 7 is a view illustrating a method of fracturing and splitting the large end portion.

FIGS. 4 to 7 illustrate a fracture/split structure of a split type connecting rod according to a first preferred embodiment of the present invention, FIG. 4 is a front view of the split type connecting rod, FIG. 5 is a cross-sectional view of a large end portion of the split type connecting rod, FIG. 6A is an enlarged view of a fracture starting point groove of the large end portion for illustrating the angle of a slope of the valley, FIG. 6B is an enlarged view of the fracture starting point groove of the large end portion for illustrating the opening of the valley and FIG. 7 illustrates a method of fracturing and splitting the large end portion.

In these figures, reference numeral 100 denotes a split type connecting rod of the present embodiment, which is preferably a nut-less type connecting rod formed by forging, casting or sintering. This split type connecting rod 100 is provided with a small end portion 101c having a piston-pin hole 101b at one end of a rod body 101a and a large end portion 101e having a crank-pin hole 101d at the other end.

The large end portion 101e is provided with shoulders 101f which extend rightward and leftward from the connection with the rod body 101a and the crank-pin hole 101d is formed in the center between both shoulders 101f. Furthermore, bolt holes 101g which extend from the underside to the vicinity of the topside of the large end portion 101e are formed in the shoulders 101f.

The entire split type connecting rod 100 including the rod portion 102 and cap portion 103 which are integral and define a single, unitary structural element is subjected to surface hardening treatment such as carburization and tempering. After the surface hardening treatment, the large end portion 101e of the split type connecting rod 100 is fractured and split into a rod portion 102 and cap portion 103 along a predetermined fracture plane (straight line A in the figure). Fracturing and splitting into the rod portion 102 and cap portion 103 is performed, as shown in FIG. 7, by placing the split type connecting rod 100 on a base 110, inserting sliders 111 which are movable in the diameter direction into the crank-pin hole 101d of the large end portion 101e and driving in a wedge 112.

Then, these fractured and split rod portion 102 and cap portion 103 are aligned with each other by contacting both fracture surfaces with each other and coupled by coupling bolts 104 fitted in the respective bolt holes 101g.

Through the surface hardening treatment, a surface hardened layer having a predetermined carburization depth is formed on the outer circumferential surface of the split type connecting rod 100. The surface hardening treatment can be performed using not only carburization and tempering but also nitriding, thermal spraying, vapor deposition or high-frequency quenching, etc.

On the inner circumferential surface of the crank-pin hole 101d, a pair of fracture starting point grooves 105 which extend in the shaft center direction of the crank-pin hole 101d are formed. These fracture starting point grooves 105 are formed by notching through cutting, wire cutting (wire cutting electric discharge machining) or machining using a laser, or other suitable process, and are formed along a line of intersection between the predetermined fracture plane (expressed by straight line A in the figure) between the rod portion 102 and cap portion 103 of the large end portion 101e, and the inner circumferential surface. That is, when the fracture starting point grooves 105 are formed by, for example, wire cutting, a conductive wire is placed near a predetermined position of the inner circumferential surface of the crank-pin hole 101d and a pulsed high-voltage is applied between this conductive wire and the inner circumferential surface of the crank-pin hole 101d. This produces a corona discharge between the conductive wire and the inner circumferential surface of the crank-pin hole 101d and this discharge causes a portion of the inner circumferential surface of the crank-pin hole 101d to be shaved, forming the fracture starting point grooves 105.

Then, by chamfering upper and lower corners between the inner circumferential surface of the crank-pin hole 101d and the fracture starting point grooves 105, a valley 106, is formed, which extends along the fracture starting point groove 105 and has a wider opening than the fracture starting point groove. The valley 106 is preferably formed through machining such as wire cutting as with the fracture starting point grooves 105 or simultaneously with molding of the split type connecting rod 100 through forging, casting or sintering, or other suitable process.

As shown in FIG. 5, FIG. 6A and FIG. 6B, sloped portions 106a making up the valley 106 are formed by linear notching in such a way that an angle β formed with the straight line A (predetermined fracture plane) passing from the shaft center a of the crank-pin hole 101d through a bottom portion 105a in a bottom surface 105c of the fracture starting point grooves 105 is preferably approximately 45 degrees. This causes the interior angle of the valley 106 to be 90 degrees. Furthermore, upper and lower inner surfaces 105b of the fracture starting point groove 105 are formed in such a way that an angle α formed with the straight line A is 0 degrees, that is, parallel to the straight line A. That is, the angle β is greater than the angle α. Furthermore, when the cross section of the valley 106 is compared with the cross section of the fracture starting point groove 105, the valley 106 preferably has a larger cross section.

Furthermore, the valley 106 preferably has a greater opening width L4 than an opening width L3 of the fracture starting point groove 105. This causes the sloped portions 106a making up the valley 106 to function as chamfering when a bi-partitioned bearing metal (not shown) is inserted into the crank-pin hole 101d in the direction of the bolt hole 101g.

Here, the chamfering function of the sloped portions 106a will be explained. When no chamfering is applied to the corners, the bearing metal contacts the corners when the bearing metal is fitted into the crank-pin hole. Metal plating such as Sn (tin) plating is applied to the surface of the bearing metal as an anti-corrosion layer. When this plated layer comes into contact with the sharp corners formed by fracturing and splitting, a portion of the plated layer is shaved into particles and these particles are stuck to the fractured surface. The stuck particles hamper high-precision recoupling of the split connecting rod. In contrast, when chamfering is applied to the corners, that is, when the valley 106 is formed, a portion of the plated layer is hardly shaved, making it possible to suppress generation of particles which is a factor of hampering of high-precision recoupling of the split connecting rod.

The ratio of the depth L2 of the fracture starting point groove 105 to a shortest distance L1 from the base point of the fracture starting point groove 105 (that is, a boundary 107 between the inner surface 105b and sloped portion 106a) to the edge of the above described bolt hole 101g is preferably about 70% or above.

Then, the operations and effects of this preferred embodiment will be explained.

According to the fracture and split structure of this preferred embodiment, a pair of fracture starting point grooves 105 which extend in the inner circumferential surface of the crank-pin hole 101d in the shaft center direction are formed, sloped portions 106a are formed in the upper and lower corners between the fracture starting point groove 105 and the inner circumferential surface of the crank-pin hole 101d and the valley 106 having the opening width L4 that is wider than the opening width L3 of the fracture starting point groove 105 is formed. In other words, the angle β formed by the valley 106 and the straight line A is preferably greater than the angle α formed by the fracture starting point groove 105. As a result, it is possible to set a greater ratio of the depth L2 of the fracture starting point groove 105 to the shortest distance L1 from the base point of the fracture starting point groove 105 to the edge of the bolt hole 101g with respect to the inner circumferential surface of the crank-pin hole 101d as the starting point and reliably form a hardened layer through surface hardening treatment up to the bottom portion 105a of the fracture starting point groove 105. This makes it possible to increase a stress intensity factor at the bottom portion 105a of the fracture starting point groove 105, so as to prevent peeling or falling at the time of fracturing and splitting and avoid trouble such as damage or burning due to falling when the engine is running.

Furthermore, since a surface hardened layer having a sufficient thickness can be secured at the bottom portion 105a of the fracture starting point groove 105, it is possible to increase brittleness at the fracture starting point. This reduces the possibility of producing peeling or falling on the fracture surface, and therefore it is possible to accurately recouple the fracture surfaces of the rod portion 102 and cap portion 103 after the fracture.

As described above, a wide valley 106 is formed by forming sloped portions 106a in the upper and lower corners on the inner circumferential surface of the crank-pin hole 101d of the above described fracture starting point groove 105. By processing at first the valley 106 of a large angle β using a method other than the starting point groove processing method (e.g., forging, casting, sintering or machining, or other suitable process) such as a laser or wire cutting and then processing the fracture starting point grooves 105, it is possible to reduce the depth of the fracture starting point groove 105 and thereby reduce the processing time. It is further possible to improve the processing accuracy and form the shape of the fracture starting point groove including the valley even through laser processing which is not originally capable of process the shape of the valley.

The present preferred embodiment preferably sets the angle α of the fracture starting point groove 105 with respect to the straight line A to about 0 degrees and the angle β of the valley 106 with respect to the straight line A to about 45 degrees. As a result, it is possible to apply reliable surface hardening treatment up to the bottom portion 105a of the fracture starting point groove 105 without sacrificing the fracture performance. The angle β can be preferably set to about 45 to about 90 degrees to realize the above described advantages and effects.

The present preferred embodiment preferably has the opening width L4 of the valley 106 that is greater than the opening width L3 of the fracture starting point groove 105, and can thereby substantially increase the depth of the fracture starting point groove 105 and reliably form a surface-hardened layer up to the bottom portion 105a of the fracture starting point groove 105.

The ratio of the depth L2 of the fracture starting point groove 105 to the shortest distance L1 from the starting point of the fracture starting point groove 105 to the edge of the bolt hole 101g is preferably about 70% or above. Therefore, it is possible to increase the stress intensity factor of the bottom portion 105a of the fracture starting point groove 105 and reliably prevent peeling and falling.

Figure 8:
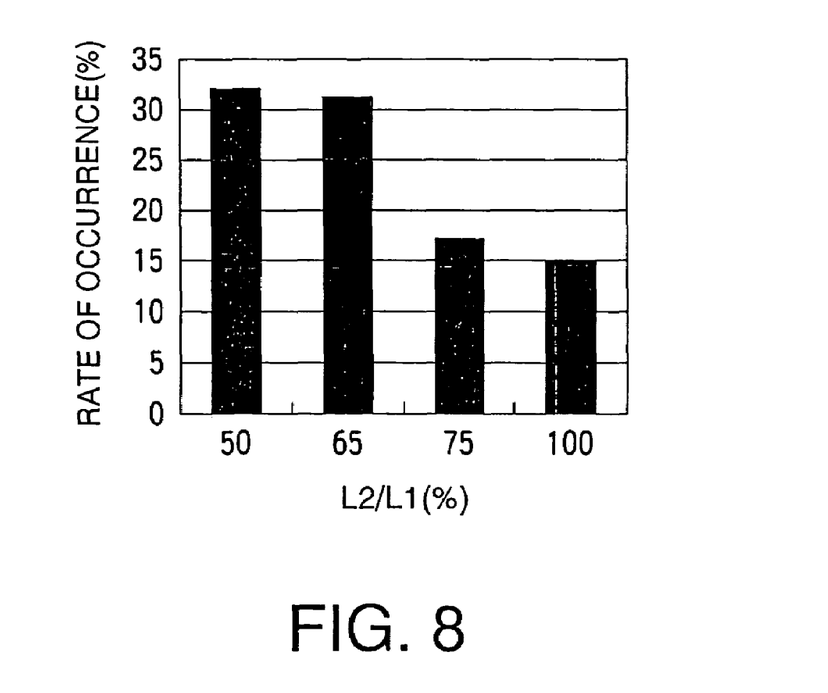
FIG. 8 is a view illustrating a relationship between the depth of the fracture starting point groove and the rate of occurrence of peeling.

FIG. 8 illustrates the result of an experiment to determine the rate of occurrence of peeling when the ratio of the groove depth L2 to the above described shortest distance L1 is changed. As is apparent from the figure, when the ratio L2/L1 is about 65% or below, the rate of occurrence of peeling exceeds about 30%. In contrast, when the ratio L2/L1 is about 70% or above, or preferably about 75% or above, the rate of occurrence of peeling falls below about 17%. Furthermore, it is appreciated that when the ratio L2/L1 is about 100%, that is, the depth of the fracture starting point groove 105 is set to a depth reaching the bolt hole 101g, the rate of occurrence of peeling is further reduced to about 15%.

Furthermore, since the valley 106 of a greater width is formed at the opening of the above described fracture starting point groove 105, it is possible to process at first the valley 106 having a large angle β with respect to the straight line A and then process the fracture starting point groove 105 and reduce the depth of the narrow groove and thereby shorten the processing time and improve the processing accuracy.

Figure 9:
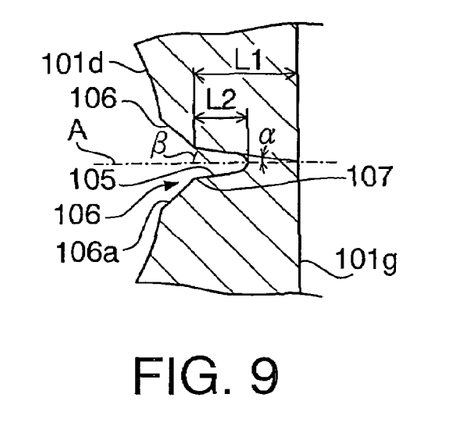
FIG. 9 is a view illustrating a modification example of the angle of the fracture starting point groove of the first preferred embodiment of the present invention.

The present preferred embodiment preferably sets the angle α of the fracture starting point groove 105 with respect to the straight line A to about 0 degrees, but as shown in FIG. 9, it is also possible to set the angle α of the fracture starting point groove 105 to, for example, about 10 degrees and the angle β of the valley 106 to, for example, about 45 degrees. In this case, it is also possible to increase the depth L2 of the fracture starting point groove 105 as with the above described preferred embodiment and reliably form the surface hardened layer up to the bottom portion 105a of the fracture starting point groove 105.

Here, an angle α exceeding 10 degrees tends to make it difficult to realize a brittle fracture and if the angle α exceeds 10 degrees and further increases, the fractured surface often transforms into a plane with ductile fractures. Therefore, to realize the above described advantages and effects, the angle α is preferably about 0 degrees to about 10 degrees.

Figure 10:
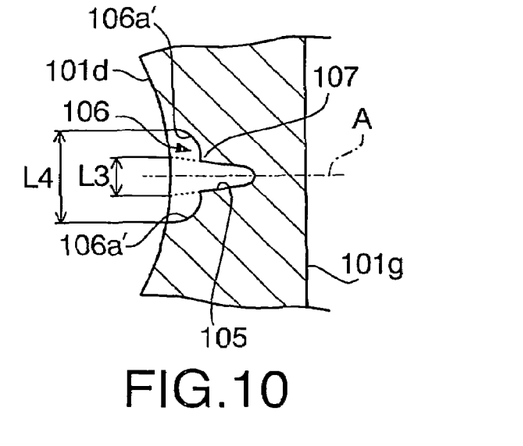
FIG. 10 is a view illustrating a modification example of the opening width of the valley of the first preferred embodiment of the present invention.

Furthermore, as shown in FIG. 10, it is also possible to set the angle α of the fracture starting point groove 105 to about 10 degrees and make the opening width L4 of the valley 106 greater than the opening width L3 of the intersection between the fracture starting point groove 105 and the extension plane of the inner circumferential surface of the crank-pin hole 101d. Also in this case, the same advantages and effects as those in the above described preferred embodiment can be realized.

FIG. 11A and 11B, FIG. 12 and FIG. 13A, 13B, 13C and 13D illustrate modification examples of the valley. In the figures, the same reference numerals as those in FIG. 6 denote the same or equivalent elements.

Figure 11A:
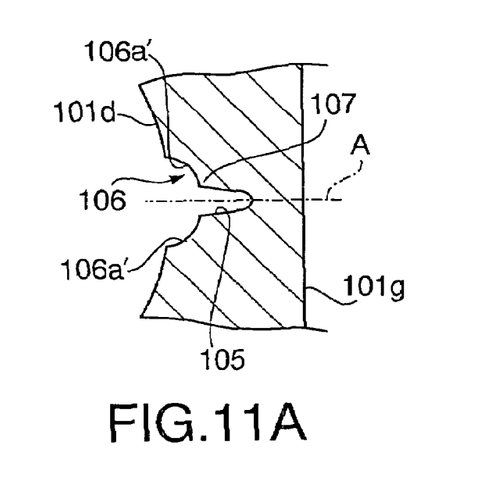
FIG. 11A is a view illustrating a modification example of the first preferred embodiment and illustrating an example where the slope of the valley is curved.
Figure 11B:
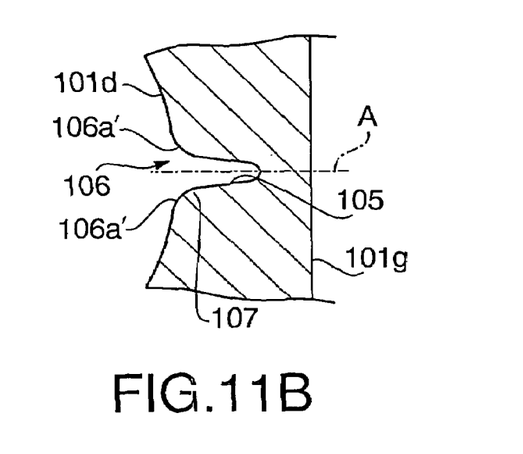
FIG. 11B is a view illustrating a modification example of the first preferred embodiment and illustrating an example where the slope of the valley has a swelled, rounded shape.
Figure 12:
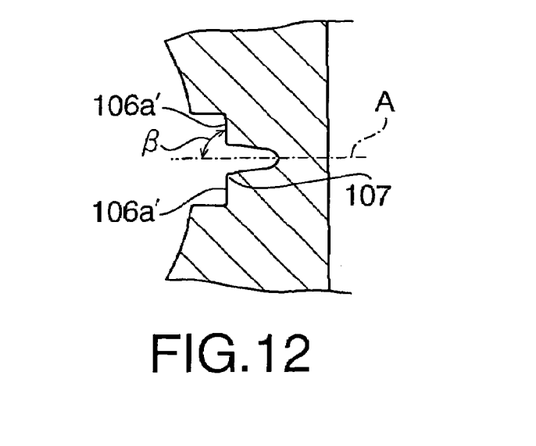
FIG. 12 is a view illustrating a modification example of the first preferred embodiment and illustrating an example where the angle of the slope of the valley is approximately 90 degrees.

FIG. 11A shows an example of curved sloped portions 106a' making up the valley 106 and FIG. 11B shows an example of the sloped portions 106a' having a swelled, rounded shape and with the valley 106 having a greater opening width than the opening width of the fracture starting point groove 105. Furthermore, FIG. 12 shows an example of the angle β of the valley 106 with respect to the straight line A that is preferably about 90 degrees.

Figure 13A:
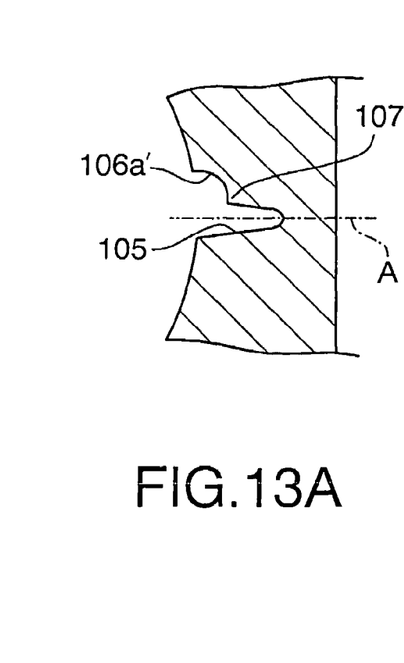
FIG. 13A is a view illustrating a modification example of the first preferred embodiment and illustrating an example where the slope of the upper corner of the valley is curved.
Figure 13B:
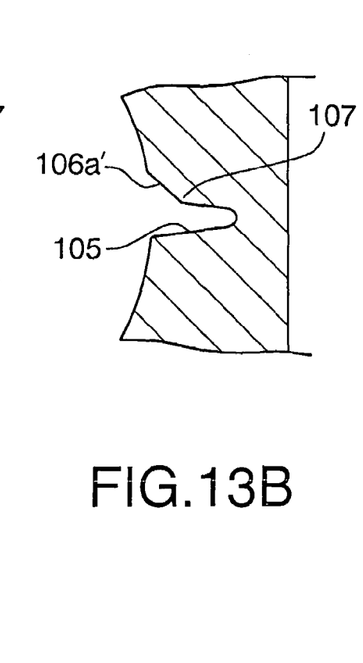
FIG. 13B is a view illustrating a modification example of the first preferred embodiment and illustrating an example where the slope of the upper corner of the valley is rectilinear.
Figure 13C:
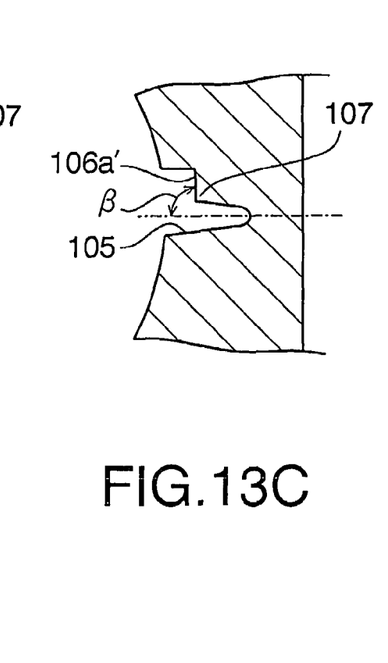
FIG. 13C is a view illustrating a modification example of the first preferred embodiment and illustrating an example where the angle of the slope of the upper corner of the valley is approximately 90 degrees.
Figure 13D:
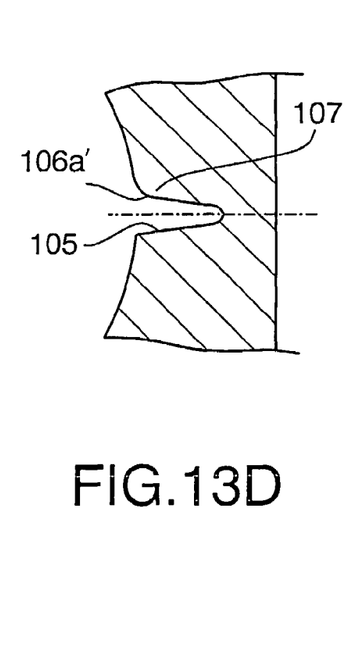
FIG. 13D is a view illustrating a modification example of the first preferred embodiment and illustrating an example where the angle of the slope of the upper corner of the valley has a swelled, rounded shape.

FIG. 13A, FIG. 13B, FIG. 13C and FIG. 13D show examples of the valley 106 made up of the sloped portion 106a' of the upper corner. FIG. 13A illustrates an example where the valley 106 preferably has a concave shape in the upper corner, FIG. 13B illustrates an example where the valley 106 preferably has a rectilinear shape in the upper corner and FIG. 13C illustrates an example where the angle β of the valley 106 is preferably about 90 degrees. Furthermore, FIG. 13D illustrates an example where the valley 106 has a swelled, rounded shape. In these modification examples, it is possible to increase the depth of the fracture starting point groove 105 and to form the surface hardened layer up to the bottom portion of the fracture starting point groove 105.

Second Preferred Embodiment

FIG. 14A, FIG. 14B, FIG. 15, FIG. 16A and FIG. 16B illustrate a split type connecting rod according to a second preferred embodiment of the present invention. In these figures, the same reference numerals as those of FIG. 4 and FIG. 6 denote the same or equivalent elements.

Figure 14A:
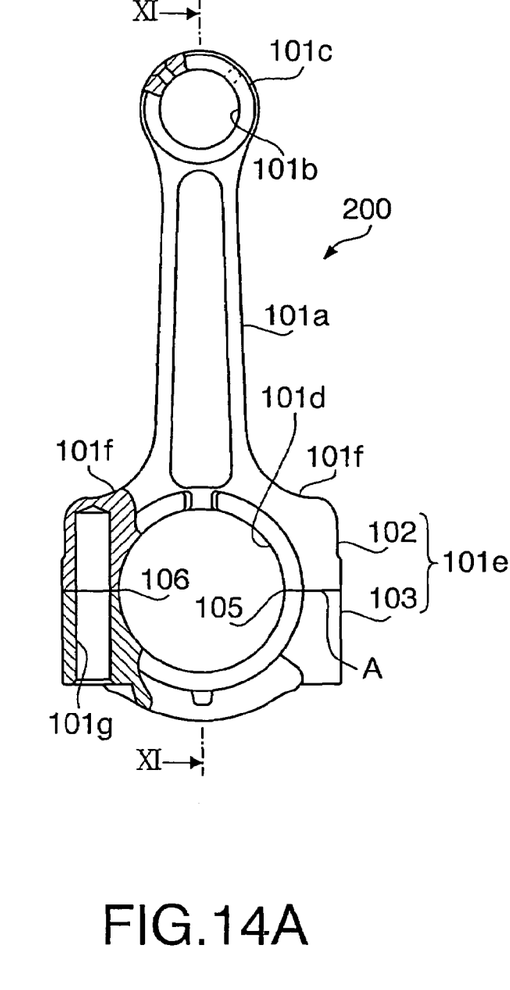
FIG. 14A is a view illustrating a split type connecting rod according to a second preferred embodiment of the present invention.

A split type connecting rod 200 in this preferred embodiment is provided with a pair of fracture starting point grooves 105 on the inner circumferential surface of a crank-pin hole 101d of a large end portion 101e and preferably substantially has the same basic configuration as that of the first preferred embodiment, and therefore only different parts will be explained.

Figure 14B:
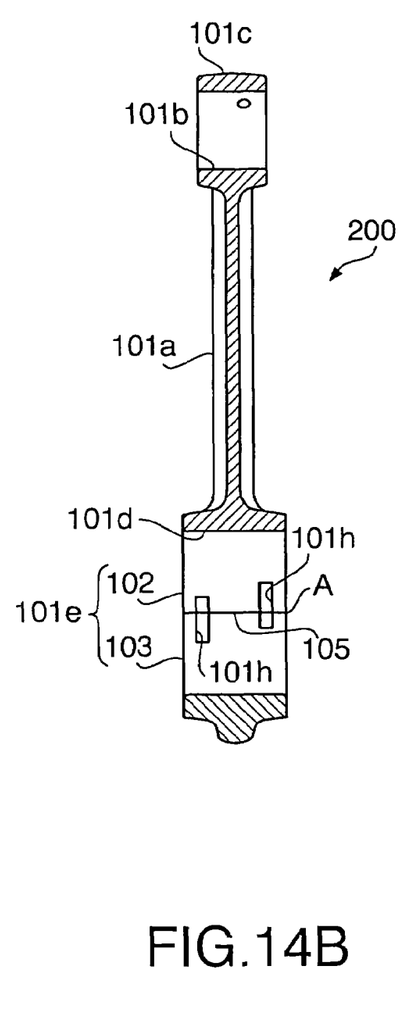
FIG. 14B is a cross-sectional view of the split type connecting rod shown in FIG. 14A along a line XI-XI.
Figure 15:
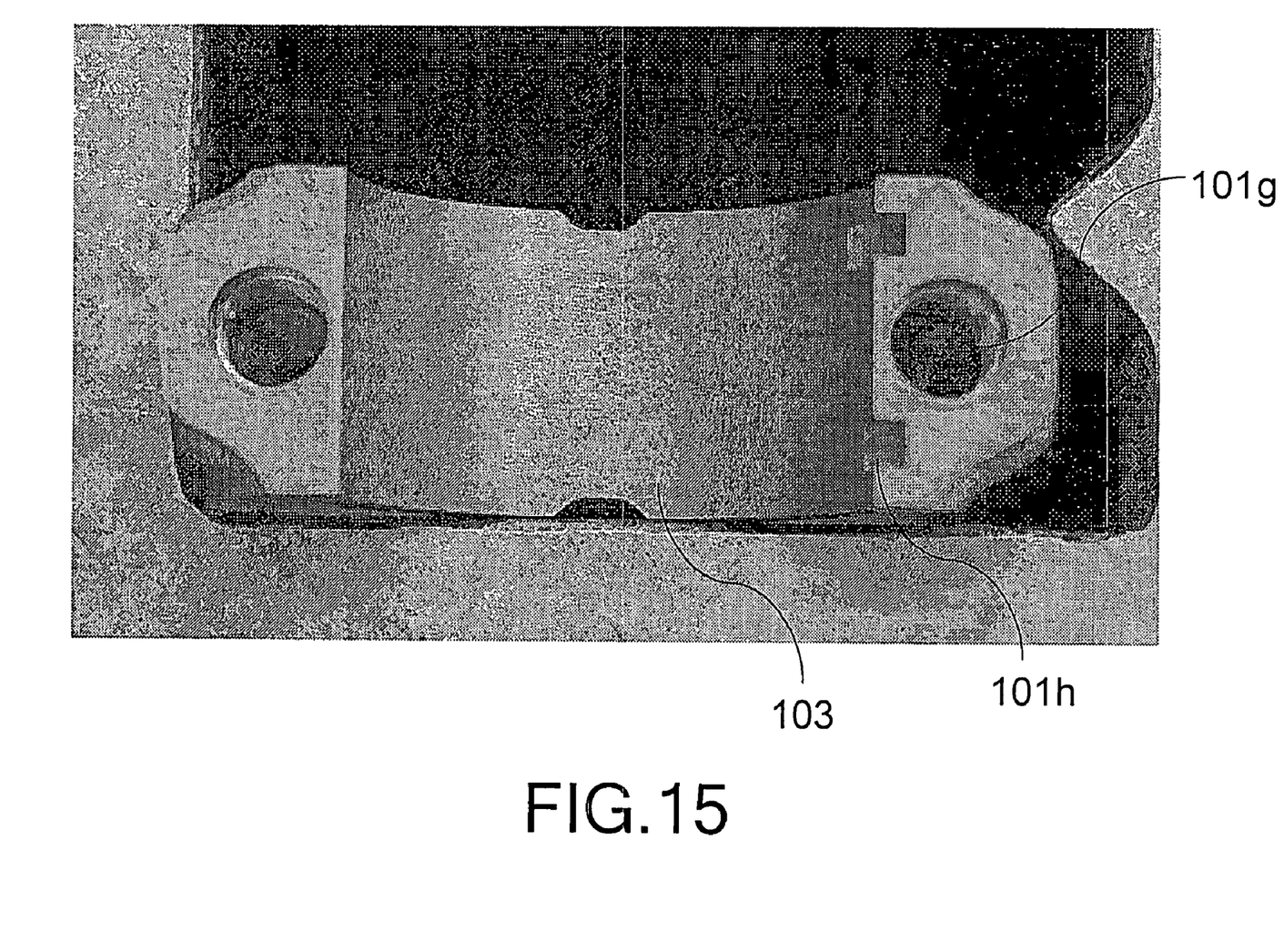
FIG. 15 is a view illustrating a large end portion of the split type connecting rod shown in FIG. 14A and FIG. 14B.

Engagement (locking) grooves 101h for use in positioning a bearing metal (not shown) and in locking rotation are preferably provided on the inner circumferential surface of the crank-pin hole 101d. This engagement groove 101h is arranged so as to extend along the circumferential direction and cross the right fracture starting point groove 105. That is, as shown in FIG. 14B, the width in the circumferential direction of the engagement grooves 101h is greater than the opening width L4 of the valley 106 and one of the engagement grooves 101h is arranged so as to cross the fractured surface and is also deviated to the rod portion 102 side, while another of the engagement grooves 101h is arranged so as to cross the fractured surface and is also deviated to the cap portion 103 side, making it possible to lock rotation of the bearing metal in the circumferential direction.

Then, the valley 106 is formed only in the corner between the left fracture starting point groove 105 and crank-pin hole 101d and the internal angle of the valley 106 is preferably about 120 degrees. That is, of the fracture starting point grooves 105 formed at the opposite positions on the inner circumferential surface of the crank-pin hole 101d, one fracture starting point groove 105 is provided near the engagement grooves 101h and another fracture starting point groove 105 is provided in the valley 106 formed at the opposite positions of the engagement grooves 101h, 101h.

In the preferred embodiment, the engagement groove 101h is preferably formed on the inner circumferential surface of the above described crank-pin hole 101d so as to cross the right fracture starting point groove 105 and the valley 106 is formed only in the left fracture starting point groove 105. As a result, it is possible to cause a fracture to start from the right and left fracture starting point grooves 105 substantially simultaneously and prevent peeling and falling from occurring on the fractured surface. That is, when the engagement groove 101h for the bearing metal is formed, this engagement groove side is likely to start fracturing in advance and a fracture on the left side is likely to start fracturing thereafter. This results in a problem that peeling or falling is more likely to occur on the engagement groove side where the fracture occurs in advance. Therefore, forming the valley 106 in the left fracture starting point groove 105 makes it possible to start fracturing on the right and left sides substantially simultaneously and thereby avoid problems of peeling and falling.

Figure 16A:
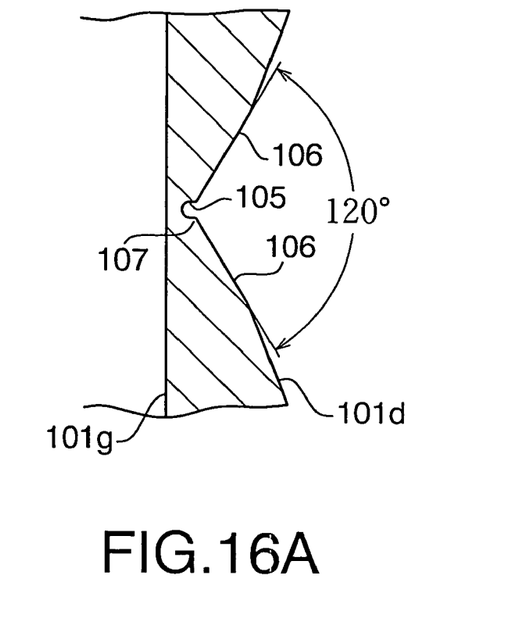
FIG. 16A is an enlarged view of a left fracture starting point groove of the large end portion.
Figure 16B:
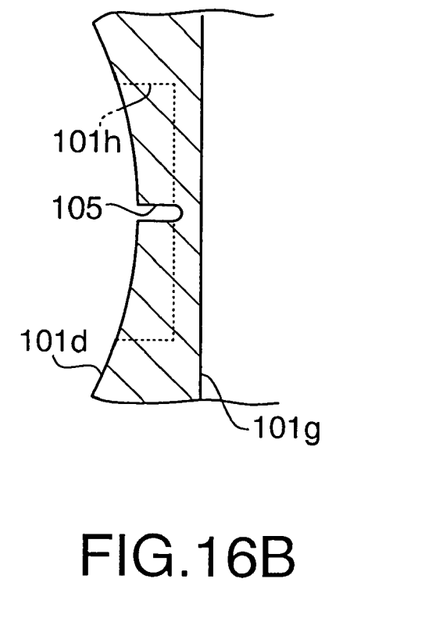
FIG. 16B is an enlarged view of a right fracture starting point groove of the large end portion.

Furthermore, the valley 106 made up of the sloped portions 106a which define an internal angle of about 120 degrees is formed in the left fracture starting point groove 105. Therefore the sloped portions 106a function as the chamfers and can there by prevent damage or insertion errors when the bearing metal is inserted into the crank-pin hole 101d. That is, when the bearing metal is used as the bearing of the crank-pin, it is necessary to form the engagement groove 101h to position the bearing metal and stop rotation. In this case, it is necessary to form a chamfer on the alignment plane between the rod portion 102 and cap portion 103 of the large end portion. Failing to apply this chamfering may damage the bearing metal at the time of insertion and prevent accurate insertion.

On the other hand, in the case of the split type connecting rod, the alignment plane between the rod portion 102 and cap portion 103 constitutes a fracture surface, and therefore it is difficult to apply chamfering after the fracturing and splitting. For this reason, chamfering is applied before the fracturing and splitting, but doing so takes time in chamfering and is disadvantageous in terms of cost-efficiency. In contrast, the present preferred embodiment of the present invention allows the above described valley 106 to be used as the chamfer after fracturing and splitting and can thereby eliminate the need for the chamfering.

Third Preferred Embodiment

Figure 17:
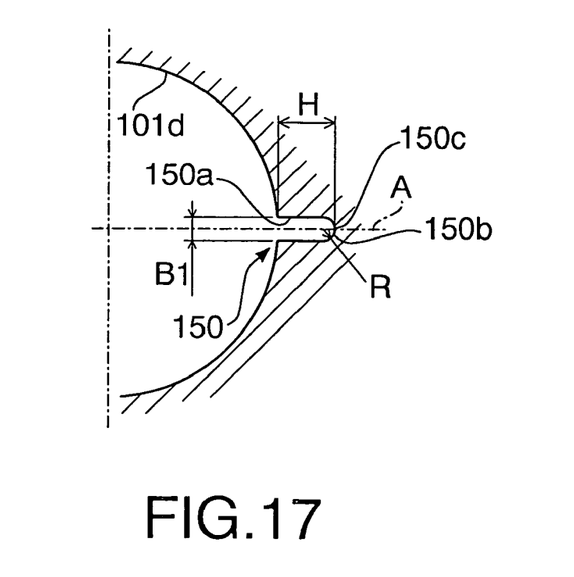
FIG. 17 is an enlarged view of a fracture starting point groove of a large end portion of a split type connecting rod according to a third preferred embodiment of the present invention.

FIG. 17 illustrates a fracture/split structure of a split type connecting rod according to a third preferred embodiment of the split type connecting rod. FIG. 4 to FIG. 6 denote the same or equivalent elements.

A split type connecting rod 300 of this preferred embodiment is provided with a pair of fracture starting point grooves 150 on the inner circumferential surface of a crank-pin hole 101d of a large end portion 101e. This fracture starting point groove 150 is made up of a wall which forms an angle of about 0 degrees with respect to a straight line A (predetermined fracture plane), that is, a substantially parallel wall, and includes a substantially parallel groove 150a having a width that is preferably set to B1 and a bottom surface 150b which connects the substantially parallel walls and forms an arc shape with a radius of R.

Here, the depth H from the inner circumferential surface of the crank-pin hole 101d of the fracture starting point groove 150 to a bottom portion 150c of the bottom surface 150b and the radius R are set in such a way that the ratio (H/R) is preferably about 1.0 to about 10.0. More specifically, H/R in this preferred embodiment is preferably about 0.2 mm/0.1 mm=2.0 or about 0.5 mm/0.1 mm=5.0.

As shown above, stress at the end σmax on the bottom surface 150b of the fracture starting point groove 150 is:

$$\sigma max = \alpha \cdot \sigma n$$

and stress concentration factor α is:

$$\alpha = 1 + 2\sqrt{(H/R)}$$

where σn is stress at a point at a sufficient distance from the bottom surface. That is, as the depth H of the fracture starting point groove 150 increases and the radius R of the bottom surface decreases, the stress concentration factor α at the bottom portion 150c of the bottom surface 150b and therefore stress at the end σmax increases, which causes a fracture to occur more easily.

In order to set the ratio H/R to as large as about 1.0 to about 10.0, this preferred embodiment preferably uses a greater depth H and a smaller radius R for the fracture starting point groove 150. Therefore the stress concentration factor α and thus stress at the end increases, which makes it possible to easily and reliably produce a fracture in the large end portion.

When the above described ratio is smaller than about 1.0, it is not possible to obtain a sufficient stress concentration factor. On the other hand, when the depth H is too large, a carburizing gas, etc., can hardly enter into the groove. Furthermore, when the fracture starting point groove is formed using a wire-cutting method, there are also constraints on the radius R depending on the wire diameter, etc., that can be adopted. Considering these points, an upper limit to the ratio H/R can be considered to be approximately 10.0. That is, the ratio H/R is more preferably about 1.0 to about 10.0.

Furthermore, this preferred embodiment assumes that the fracture starting point groove 150 is made up of walls which form an angle of about 0 degrees with respect to the straight line A (predetermined fracture plane), that is, substantially parallel walls and formed of substantially parallel grooves 150a having a width that is preferably set to as narrow as B1. As a result, it is possible to reduce an amount of processing required for forming the fracture starting point groove 150, form the groove easily and quickly using a wire-cutting method, reduce an amount of reduction of the area of the inner circumferential surface of the crank-pin hole 101d due to the provision of the fracture starting point groove 150 and avoid the plane pressure from increasing accordingly.

Furthermore, since the fracture starting point groove 150 is made up of the substantially parallel groove 150a, it is easy to check whether the fracture starting point groove 150 is formed as planned or not.

Figure 18:
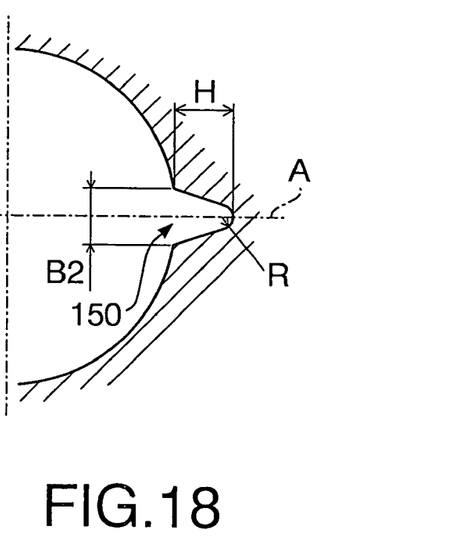
FIG. 18 illustrates a modification example of the third preferred embodiment.
Figure 19:
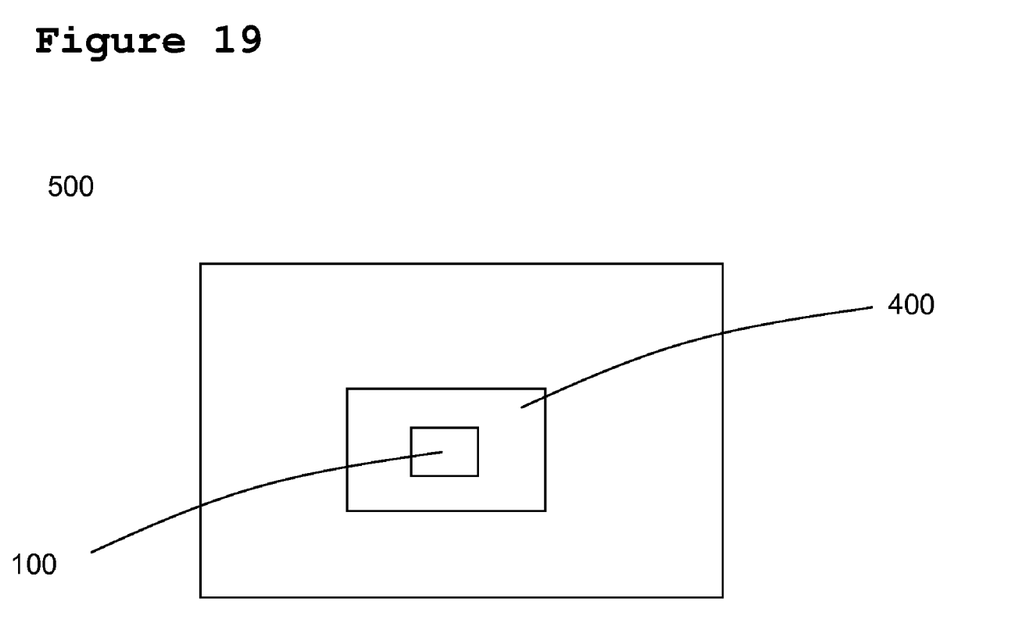
FIG. 19 illustrates a vehicle 500 and an engine 400 including the split type connecting rod 100.

As shown in FIG. 18, the fracture starting point groove 150 can also be formed in such a way that the angle formed by the wall making up the fracture starting point groove 150 with respect to the straight line A (predetermined fracture plane) is approximately 10 degrees or less.

Also in this case, the ratio of the depth H to the radius R (H/R) is preferably about 1.0 to about 10.0. Doing so makes it possible to increase the stress concentration factor $\alpha$, and thus stress at the end $\sigma max$ and to produce a fracture in the large end portion easily and reliably.

The present invention is not limited to the above described preferred embodiments, and various variations and modifications may be possible without departing from the scope of the present invention.

This application is based on the Japanese Patent Application No.2002-378020 filed on Dec. 26, 2002 and the Japanese Patent Application No.2003-315614 filed on Sep. 8, 2003, the entire content of which are expressly incorporated by reference herein.

What is claimed is:

1. A split connecting rod comprising:
   a crank-pin hole;
   a valley provided on an inner circumferential surface of the crank-pin hole; and
   a fracture starting point groove provided at the base portion of said valley; wherein
   the fracture starting point groove includes a pair of walls parallel to a predetermined fracture plane, and a bottom surface which connects the pair of parallel walls and forms an arc with a radius of R; and
   the valley forms an angle with respect to the predetermined fracture plane greater than an angle that the pair of walls of the fracture starting point groove define with respect to the predetermined fracture plane.

2. The split connecting rod according to claim 1, wherein a width of said fracture starting point groove is less than a width of said valley.

3. The split connecting rod according to claim 1, wherein said valley is provided such that said base portion is located at a position where a ratio of a depth of said fracture starting point groove to a shortest distance from an opening of said fracture starting point groove to a bolt hole is about 70% or more.

4. The split connecting rod according to claim 1, further comprising a bearing locking groove provided on said inner circumferential surface of the crank-pin hole, wherein said valley is provided on the inner circumferential surface of the crank-pin hole at a position opposite to a position where the bearing locking groove is provided on said inner circumferential surface of the crank-pin hole.

5. The split connecting rod according to claim 4, wherein said bearing locking groove includes a pair of concave portions located at positions that are deviated in the circumferential direction of said inner circumferential surface of the crank-pin hole.

6. The split connecting rod according to claim 5, wherein a width of said valley in the circumferential direction of said inner circumferential surface is less than a width of the pair of concave portions of said bearing locking groove in the circumferential direction of said inner circumferential surface.

7. The split connecting rod according to claim 1, wherein the split connecting rod is a nut-less connecting rod that is made of one of forged material, a cast material and a sintered material.

8. The split connecting rod according to claim 1, further comprising a small end portion and a large end portion, wherein the large end portion includes the valley and the fracture starting point groove.

9. The split connecting rod according to claim 1, further comprising a rod portion and a cap portion.

10. The split connecting rod according to claim 1, wherein the fracture starting point groove includes a pair of the fracture starting point grooves provided on the inner circumferential surface of the crank-pin hole.

11. The split connecting rod according to claim 10, wherein the angle between the predetermined fracture plane and the valley is approximately 45 degrees.

12. The split connecting rod according to claim 11, wherein an interior angle of the valley is approximately 90 degrees.

13. The split connecting rod according to claim 1, wherein a cross section of the valley is larger than a cross section of the fracture starting point groove.

14. The split connecting rod according to claim 1, wherein the valley includes a pair of sloped portions.

15. The split connecting rod according to claim 1, wherein a depth H from the inner circumferential surface of the crank-pin hole to a bottom portion of the bottom surface and the radius R are set such that a ratio H/R is about 1.0 to about 10.0.

16. An engine comprising the split connecting rod according to claim 1.

17. A vehicle comprising the split connecting rod according to claim 1.

* * * * *